United States Patent [19]

Yoshitake et al.

[11] Patent Number: 6,087,032

[45] Date of Patent: Jul. 11, 2000

[54] SOLID POLYMER ELECTROLYTE TYPE FUEL CELL

[75] Inventors: Masaru Yoshitake; Naoki Yoshida; Toyoaki Ishizaki; Shinji Terazono, all of Yokohama, Japan

[73] Assignee: Asahi Glass Company Ltd., Tokyo, Japan

[21] Appl. No.: 09/133,381

[22] Filed: Aug. 13, 1998

[51] Int. Cl.⁷ .............................. H01M 8/10; H01M 4/86
[52] U.S. Cl. ................... 429/33; 429/40; 429/41; 429/46; 429/30
[58] Field of Search ................... 429/40, 29, 33, 429/41, 42, 46, 30

[56] References Cited

U.S. PATENT DOCUMENTS 5,795,668   8/1998   Banerjee ..................... 429/33

*Primary Examiner*—Stephen Kalafut
*Assistant Examiner*—Angela J. Martin
*Attorney, Agent, or Firm*—Oblon, Spivak, McClelland, Maier & Neustadt, P.C.

[57] ABSTRACT

A polymer electrolyte fuel cell comprising a membrane-form solid polymer electrolyte, a fuel electrode disposed on one side of the polymer electrolyte, and an air electrode disposed on the other side of the polymer electrolyte, wherein each of the fuel electrode and the air electrode is made of a gas diffusion electrode having a catalyst covered with a fluorocarbon ion exchange resin, and the ion exchange capacity of the ion exchange resin of the fuel electrode is larger than the ion exchange capacity of the ion exchange resin of the air electrode.

13 Claims, No Drawings

SOLID POLYMER ELECTROLYTE TYPE FUEL CELL

BACKGROUND OF THE INVENTION

1. Field of the Invention

The present invention relates to a polymer electrolyte fuel cell which can be made to have a high output density and which is very much expected to be practically useful.

2. Discussion of Background

Attention has been drawn to fuel cells as a power generation system which gives no adverse effect to the global environment, since their reaction product is only water in principle. Among them, a polymer electrolyte fuel cell or a proton exchange membrane fuel cell has a feature that, as compared with other fuel cell systems, a very high output can be obtained at a relatively low operation temperature, and an active effort is being made to develop it for application to automobiles. As reasons why a high output is obtainable by a polymer electrolyte fuel cell, it may be mentioned that a highly conductive ion exchange membrane has been developed as the solid polymer electrolyte, and that it has been made possible to obtain an extremely high activity by covering the catalyst used for a gas diffusion electrode layer with an ion exchange resin. Many studies are being made on a process for producing a membrane/electrode assembly (hereinafter referred to simply as MEA) for a polymer electrolyte fuel cell utilizing these characteristics.

Polymer electrolyte fuel cells which are presently being studied, have an operation temperature of from about 50 to about 120° C. and thus have a problem that waste heat from such fuel cells can hardly be utilized, for example, as an auxiliary power. To offset such a drawback, it is desired that the polymer electrolyte fuel cell has a particularly high output. Further, it is desired to develop an assembly whereby a high energy efficiency and a high output density can be obtained even under an operation condition where the fuel and air utilization ratios are high.

Under an operation condition where the operation temperature is low and the gas utilization ratio is high, clogging (flooding) of the electrode porous body is likely to take place due to condensation of steam, at the air electrode where water forms. Accordingly, in order to obtain a stable performance for a long period of time, it is necessary to secure water repellency of the electrode so as to prevent such flooding. This is particularly important in the case of a polymer electrolyte fuel cell whereby a high output density can be obtained at a low temperature.

To secure such water repellency, it has been studied to incorporate, as a water repellant, a fluoride resin or a fluorocarbon resin having high water repellency, such as polytetrafluoroethylene (PTFE), a tetrafluoroethylene/hexafluoropropylene copolymer (FEP) or a tetrafluoroethylene/perfluoroalkylvinyl ether copolymer (PFA)) into the electrode.

However, when the amount of such a water repellant is increased, the electric resistance of the electrode increases, since such a material is non electroconductive, and the thickness of the electrode also increases, whereby there have been problems that the gas permeability tends to decrease, and the output tends to decrease, and it has been difficult to secure the stability of the high output and cell characteristics.

From the viewpoint of the electrical conductivity and the gas permeability, it is effective to reduce the amount of the water repellant as far as possible in order to obtain a high output. Further, the concentration of ion exchange groups of the ion exchange resin to be used for covering the catalyst, should better be high, so that the electrical conductivity will be high, and a high output can readily be obtainable. However, it has been found that when an ion exchange resin having a high concentration of ion exchange groups, is employed, flooding is likely to result, and the output tends to decrease, although the initial performance may be improved. This is believed attributable to the fact that if the concentration of ion exchange groups of an ion exchange resin becomes high, the water content increases, and swelling of the resin increases.

SUMMARY OF THE INVENTION

The present inventors have conducted an extensive study to secure both the water repellency and the electrical conductivity of the electrode and have finally arrived at the present invention.

The present invention provides a polymer electrolyte fuel cell comprising a membrane-form polymer electrolyte, a fuel electrode (anode) disposed on one side of the polymer electrolyte, and an air electrode (cathode) disposed on the other side of the polymer electrolyte, wherein each of the fuel electrode and the air electrode is made of a gas diffusion electrode having a catalyst covered entirely or partially with a fluorocarbon ion exchange resin, and the ion exchange capacity of the ion exchange resin of the fuel electrode is larger than the ion exchange capacity of the ion exchange resin of the air electrode.

DETAILED DESCRIPTION OF THE PREFERRED EMBODIMENTS

In the present invention, the ion exchange groups of the fluorocarbon ion exchange resin to cover the catalyst, are preferably of a sulfonic acid type or a phosphonic acid type. And, the ion exchange capacity (calculated as an acid type) of the resin of the fuel electrode is larger than that of the air electrode, preferably, by from 0.01 to 1.5 meq./g dry resin, more preferably by from 0.05 to 1.0 meq./g dry resin.

The ion exchange capacity (calculated as an acid type) of the fluorocarbon ion exchange resin to cover the catalyst of the fuel electrode, is preferably within a range of from 1.0 to 4.0 meq./g dry resin, more preferably from 1.05 to 3.5 meq./g dry resin. The ion exchange capacity of the fluorocarbon ion exchange resin to cover the catalyst of the air electrode, is preferably within a range of from 0.20 to 1.0 meq./g dry resin, more preferably from 0.30 to 0.95 meq./g dry resin. By adopting such ion exchange resins, a high output can constantly be obtained with a minimum required amount of a water repellant.

The weight proportions of the catalyst (inclusive of the weight of a carrier in the case of a catalyst supported on a carrier such as carbon) and the ion exchange resin in the gas diffusion electrode constituting the fuel electrode and the air electrode in the present invention, are preferably such that the catalyst:the ion exchange resin=0.40 to 0.95:0.05 to 0.60, whereby a gas diffusion electrode excellent in the water repellency and the electrical conductivity, can be obtained.

For the preparation of the gas diffusion electrode of the present invention, a mixed liquid comprising the catalyst, the ion exchange resin and, if necessary, a water repellant, a thickener, a diluting solvent, etc., is used. The fluorocarbon sulfonic acid type ion exchange resin to be used as an ion exchange resin, is preferably a perfluorocarbon sulfonic acid type ion exchange resin made of a copolymer of $CF_2=CF_2$ with $CF_2=CF-(OCF_2CFX)_m-O_p-(CF_2)_n-SO_3H$, wherein m is from 0 to 3, n is from 1 to 12, p is 0 or 1, and X is F or $CF_3$.

Further, the fluorocarbon phosphonic acid type ion exchange resin to be used as an ion exchange resin, is preferably a perfluorocarbon copolymer of $CF_2=CF_2$ with a fluorovinyl compound of the formula $CF_2=CF-(OCF_2CFX)_m-O_p-(CF_2)_n-A$, wherein m is an integer of from 0 to 8, n is an integer of from 0 to 12, p is 0 or 1, X is F or $CF_3$, and A is a $PO_3H_2$ group or its precursor functional group.

As preferred examples of such a fluorovinyl compound, the following compounds may be mentioned, wherein each of R and R' is an alkyl group, and R and R' may be the same alkyl groups or different alkyl groups.

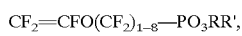

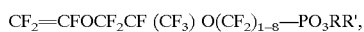

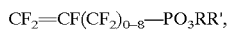

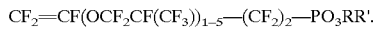

In addition to the above-mentioned monomers constituting the above fluorocarbon polymer, a perfluoroolefin such as hexafluoropropylene or chlorotrifluoroethylene, a perfluoroalkylvinyl ether, or the like, may also be copolymerized.

In general, the larger the ion exchange capacity of the ion exchange resin to be used for the electrode is, the larger are the water content, the proton conductivity and the hydrogen permeability. The viscosity of the liquid mixture to be used for the preparation of the above electrode, may be within a wide viscosity range, i.e. ranging from a dispersion liquid state of about a few tens cP to a paste state of about 20,000 cP, by suitably selecting the method for forming the catalyst layer of the electrode.

The water repellant to be used as the case requires, as mentioned above, may, for example, be a tetrafluoroethylene/hexafluoropropylene copolymer (FEP), a tetrafluoroethylene/perfluoroalkylvinyl ether copolymer (PFA) or a polytetrafluoroethylene (PTFE), or the following soluble fluorine-containing polymers.

Here, the soluble fluorine-containing polymers are soluble fluorine-containing polymers which are insoluble in a solvent such as water or an alcohol and which are soluble in a certain solvent. They are high molecular polymers which are solid from room temperature to 150° C. as the operational temperature range of polymer electrolyte fuel cells and those having substantially no ion exchange groups in the repeating units except for the terminals of the high molecular polymers. Among them, the following perfluorocarbon polymers are preferred from the viewpoint of the chemical stability and the water repellency.

As the soluble perfluorocarbon polymer, preferred is a thermoplastic polymer having cyclic repeating units of the following formulae.

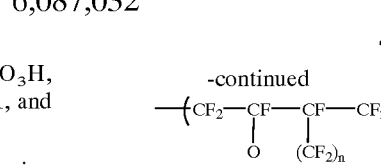 and/or

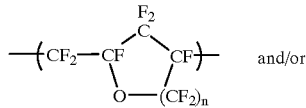

wherein n is an integer of 1 or 2. This polymer has an aliphatic ring structure in its molecule and is hardly crystallizable due to twisting of the molecule attributable to the ring structure, whereby it is soluble in a fluorine-type solvent. The nature of this polymer and a process for its preparation are disclosed in U.S. Pat. No. 4,897,457. As a solvent for the soluble perfluorocarbon polymer, at least one member selected from fluoroalkanes, fluorotrialkylamines and fluoroalkyltetrahydrofurans, may be used.

The molecular weight of the soluble perfluorocarbon polymer ranges from a few thousands to about 20,000. If a solution having the same concentration is prepared, the larger the molecular weight, the higher the viscosity. However, by using one having a molecular weight of from 5,000 to 10,000, it is possible to secure penetrability of the solution when it is used for an impregnation operation and at the same time to obtain adequate adhesion to the surface of pores and to maintain the water repellency of the electrode.

The above-mentioned water repellant is used preferably in an amount of from 0.01 to 30 wt %, more preferably from 0.1 to 20 wt %, based on the catalyst layer of the electrode.

Further, as mentioned above, for the preparation of the gas diffusion electrode, a thickener and a diluting solvent may be used. As the thickener, ethyl cellulose, methyl cellulose or a cellosolve type thickener may be employed. Preferred is one which requires no removal operation. As the diluting solvent, an alcohol such as methanol, ethanol or isopropanol, a fluorocarbon, a hydrofluorocarbon, a hydrochlorofluorocarbon or water, may, for example, be used.

The membrane-form polymer electrolyte to be used in the present invention, may, for example, be preferably a perfluorosulfonic acid type ion exchange membrane, a perfluorophosphonic acid type ion exchange membrane, a partially fluorinated sulfonic acid type ion exchange membrane, a partially fluorinated phosphonic acid type ion exchange membrane, a non-fluorinated hydrocarbon type sulfonic acid type ion exchange membrane or a non-fluorinated hydrocarbon type phosphonic acid type ion exchange membrane.

As the perfluorosulfonic acid type ion exchange membrane, it is preferable to employ an ion exchange membrane made of a copolymer of $CF_2=CF_2$ with $CF_2=CF-(OCF_2CFX)_m-O_p-(CF_2)_n-SO_3H$, wherein m is from 0 to 3, n is from 1 to 12, p is 0 or 1, and X is F or $CF_3$. As the perfluorophosphonic acid type ion exchange membrane, preferred is a perfluorocarbon copolymer of $CF_2=CF_2$ with a fluorovinyl compound of the formula $CF_2=CF-(OCF_2CFX)_m-O_p-(CF_2)_n-A$, wherein m is an integer of from 0 to 8, n is an integer of from 0 to 12, p is 0 or 1, X is F or $CF_3$, and A is a $PO_3H_2$ group or its precursor functional group. As preferred examples of the fluorovinyl compound, the following compounds may be mentioned, wherein each of R and R' is an alkyl group, and R and R' may be the same alkyl groups or different alkyl groups.

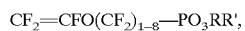

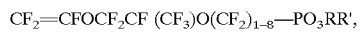

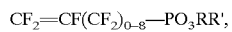

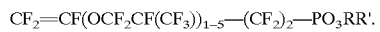

In addition to the above-mentioned monomers constituting the above fluorocarbon polymer, a perfluoroolefin such as hexafluoropropylene or chlorotrifluoroethylene, a perfluoroalkylvinyl ether, or the like, may be copolymerized.

The partially fluorinated sulfonic acid type ion exchange membrane may, for example, be an ion exchange membrane prepared by polymerizing trifluorostyrene to form a membrane, followed by sulfonization, or an ion exchange membrane prepared by radiation graft polymerizing styrene to an ethylene/tetrafluoroethylene copolymer or a tetrafluoroethylene/propylene hexafluoride copolymer (FEP), as disclosed in JP-A-9-102322, followed by sulfonization.

The partially fluorinated phosphonic acid type ion exchange membrane may, for example, be an ion exchange membrane prepared by radiation graft polymerizing styrene to an ethylene/tetrafluoroethylene copolymer or a tetrafluoroethylene/propylene hexafluoride copolymer (FEP), followed by phosphonization.

The non-fluorinated hydrocarbon type sulfonic acid type ion exchange membrane may, for example, be an ion exchange membrane obtained by sulfonization of a styrene/divinylbenzene copolymer or an ion exchange membrane prepared by sulfonization of an aromatic polyether ether ketone resin, as disclosed in U.S. Pat. No. 5,362,836.

The non-fluorinated hydrocarbon type phosphonic acid ion exchange membrane may, for example, be one having phosphonic acid groups introduced to a styrene/divinylbenzene copolymer. However, the present invention is by no means restricted to such specific examples.

In the present invention, an electrode may be applied by various methods, such as a method of directly forming it on an ion exchange membrane, a method in which an electrode is once formed in a layer form on a substrate such as a carbon paper, and then bonded to an ion exchange membrane, and a method wherein an electrode is formed on a separate flat plate and then transferred to an ion exchange membrane.

As a method for forming a gas diffusion electrode, it is possible to employ a conventional method of e.g. spraying, coating or filtering a mixed liquid for the preparation of the gas diffusion electrode. In the case where the electrode is prepared separately, the method of transferring it to the ion exchange membrane may be a hot pressing method or an adhesion method (JP-A-7-220741 or JP-A-7-254420).

In the present invention, as the fluorocarbon ion exchange resin to cover the catalyst for the fuel electrode, one having a large ion exchange capacity is used, whereby the hydrogen permeability is high, and hydrogen supply from a gas phase to the catalyst particles, is secured. Further, during the power generation, hydrated proton moves from the anode to the cathode dragging water molecules, whereby the ion exchange resin which covers the catalyst, tends to be dehydrated to have a high resistance. However, such tendency can be avoided, as an ion exchange resin having a large ion exchange capacity and a large water content, is employed, whereby water will readily be supplied from steam in the gas phase.

At the air electrode, swelling of the ion exchange resin which covers the catalyst, is little, and a path for diffusion of gas can be secured by employing an ion exchange resin having a small ion exchange capacity and a low water content. Further, by preferably incorporating a water repellant to the gas diffusion electrode, the water repellency of the electrode can be improved. Accordingly, formed water can readily be discharged, and supply of oxygen can be secured, whereby the over voltage can be reduced even at a high current density.

Now, specific embodiments of the present invention will be described with reference to working Examples (Examples 1, 2 and 4 to 8) and a Comparative Example (Example 3). However, the present invention is by no means restricted by such specific Examples.

Examples 1 to 3

Using a catalyst having 40 wt % of platinum supported on carbon black powder and solutions in ethanol of ion exchange resins made of a copolymer of $CF_2=CF_2$ with $CF_2=CF—OCF_2CF(CF_3)—OCF_2CF_2SO_3H$, catalyst dispersions 1, 2 and 3 were prepared (the weight proportions of the catalyst (inclusive of the carrier) and the ion exchange resin in each dispersion were 0.80:0.20). The ion exchange capacities (meq./g dry resin) of the ion exchange resins contained in dispersions 1, 2 and 3, were 0.91, 1.0 and 1.1, respectively.

Using Flemion (registered trade mark by Asahi Glass Company Ltd.) S membrane (perfluorosulfonic acid type ion exchange membrane, ion exchange capacity: 1.0 meq./g dry resin, thickness: 80 μm) as an ion exchange membrane, the above catalyst dispersion 1, 2 or 3 was sprayed thereon so that the amount of platinum in a fuel electrode and an air electrode (each having an electrode area of 10 $cm^2$) would be 1 mg/$cm^2$, to obtain MEA of Examples 1 to 3, as shown in Table 1.

Each of such MEA was assembled into a cell for measurement, and continuous operation was carried out at a constant driving voltage of 0.65 V at a cell temperature of 70° C. at 3 ata in a hydrogen/air system, whereby the results as shown in Table 1 were obtained. The drop with time of the output current density was minimum in Example 1.

TABLE 1

| | Ion exchange capacity of ion exchange resin | | Output current density (A/$cm^2$) | | |
|---|---|---|---|---|---|
| | (meq./g dry resin) | | 10 | 500 | 1000 |
| | Fuel electrode | Air electrode | hours later | hours later | hours later |
| Example 1 | 1.1 | 0.91 | 0.92 | 0.78 | 0.65 |
| Example 2 | 1.1 | 1.0 | 0.91 | 0.75 | 0.58 |
| Example 3 | 1.1 | 1.1 | 0.81 | 0.50 | 0.28 |

Example 4

An MEA was prepared in the same manner as in Example 1 except that in Example 1, the ion exchange capacity (meq./g dry resin) of the ion exchange resin used for the air electrode was changed to 0.90, and the ion exchange capacity of the ion exchange resin used for the fuel electrode was changed to 1.2.

Example 5

$CF_2=CF_2$ and $CF_2=CFOCF_2CF$ $(CF_3)O(CF_2)_2PO_3(CH_3)_2$ were copolymerized to obtain a polymer containing phosphonic acid groups, having an ion exchange capacity of 0.9 meq./g dry resin. This polymer was hydrolyzed in an aqueous solution of 1N hydrochloric acid and acetic acid, then washed with water and immersed in 1N hydrochloric acid. Then, it was washed with water, then dried at 60° C. for 1 hour and dissolved in ethanol to obtain a solution. Except for using this solution for the air electrode, an MEA was prepared in the same manner as in Example 1.

Example 6

Using a copolymer containing phosphonic acid groups, made of a copolymer of $CF_2=CF_2$ with $CF_2=CFOCF_2CF$ $(CF_3)O—(CF_2)_2PO_3(CH_3)_2$ and having an ion exchange capacity of 1.0 meq./g dry resin, this copolymer was melted to prepare a film. Then, this film was hydrolyzed in an aqueous solution of 1N hydrochloric acid and acetic acid, then washed with water and immersed in 1N hydrochloric acid. Then, it was washed with water and dried at 60° C. for 1 hour to obtain an ion exchange membrane having a thickness of 50 μm. Then, in the same manner as disclosed in Example 5, a solution having a polymer containing phosphonic acid groups with an ion exchange capacity of 1.1 meq./g dry resin dissolved in ethanol, was prepared. An MEA was prepared in the same manner as in Example 1 except that this perfluorosulfonic acid type ion exchange membrane was used as a solid electrolyte, and the above-mentioned perfluorophosphonic acid type ion exchange resin having an ion exchange capacity of 0.90 meq./g dry resin was used for the air electrode, and the above-mentioned perfluorophosphonic acid type ion exchange resin having an ion exchange capacity of 1.1 meq./g dry resin, was used for the fuel electrode.

Example 7

A cation exchange membrane having an ion exchange capacity of 1.5 meq./g dry resin, was obtained by radiation graft polymerizing styrene to an ethylene/tetrafluoroethylene copolymer film (Aflex film, tradename, manufactured by Asahi Glass Company Ltd., thickness: about 100 μm), followed by sulfonization. An electrode/membrane assembly was prepared in the same manner as in Example 1 except that this cationic exchange membrane was used as a polymer electrolyte.

Example 8

As a water repellant, a solution of Cytop (tradename, manufactured by Asahi Glass Company Ltd.) dissolved in perfluorooctane, was mixed to a catalyst having 40 wt % of platinum supported on carbon black powder and a solution in ethanol of an ion exchange resin made of a copolymer of $CF_2=CF_2$ with $CF_2=CF—OCF_2CF(CF_3)—OCF_2CF_2SO_3H$, to obtain a catalyst dispersion wherein the weight proportions of the catalyst (inclusive of the carrier), the ion exchange resin and Cytop were 0.75:0.20:0.05. An MEA was prepared in the same manner as in Example 1 except that this catalyst dispersion was used as a catalyst dispersion for the air electrode.

Such an MEA was assembled in a cell for measurement, and continuous operation was carried out at a constant driving voltage of 0.65 V at a cell temperature of 70° C. at 3 ata in a hydrogen/air system, and the results are shown in Table 2.

TABLE 2

|  | Output current density (A/cm$^2$) | | |
| --- | --- | --- | --- |
|  | 10 hours later | 500 hours later | 1000 hours later |
| Example 4 | 0.94 | 0.82 | 0.78 |
| Example 5 | 0.92 | 0.85 | 0.80 |
| Example 6 | 0.92 | 0.85 | 0.81 |
| Example 7 | 0.90 | 0.80 | 0.70 |
| Example 8 | 0.92 | 0.88 | 0.85 |

As described in the foregoing, according to the present invention, it is possible to obtain a polymer electrolyte fuel cell which presents a high output current density and which shows little deterioration with time of the output characteristics.

What is claimed is:

1. A polymer electrolyte fuel cell comprising a membrane-form polymer electrolyte, a fuel electrode disposed on one side of the polymer electrolyte, and an air electrode disposed on the other side of the polymer electrolyte, wherein each of the fuel electrode and the air electrode is made of a gas diffusion electrode having a catalyst covered with a fluorocarbon ion exchange resin, and the ion exchange capacity of the ion exchange resin of the fuel electrode is larger than the ion exchange capacity of the ion exchange resin of the air electrode.

2. The polymer electrolyte fuel cell according to claim 1, wherein the ion exchange capacity of the ion exchange resin of the fuel electrode is larger by from 0.01 to 1.5 meq./g dry resin than the ion exchange capacity of the ion exchange resin of the air electrode.

3. The polymer electrolyte fuel cell according to claim 1, wherein the weight proportions of the catalyst and the ion exchange resin in the gas diffusion electrode are such that the catalyst : the ion exchange resin =0.40 to 0.95:0.05 to 0.60.

4. The polymer electrolyte fuel cell according to claim 1, wherein the membrane-form solid polymer electrolyte is a perfluorosulfonic acid ion exchange membrane.

5. The polymer electrolyte fuel cell according to claim 1, wherein the membrane-form solid polymer electrolyte is a perfluorophosphonic acid ion exchange membrane.

6. The polymer electrolyte fuel cell according to claim 1, wherein the membrane-form solid polymer electrolyte is a partially fluorinated sulfonic acid ion exchange membrane.

7. The polymer electrolyte fuel cell according to claim 1, wherein the membrane-form solid polymer electrolyte is a partially fluorinated phosphonic acid ion exchange membrane.

8. The polymer electrolyte fuel cell according to claim 1, wherein the membrane-form solid polymer electrolyte is a non-fluorinated hydrocarbon sulfonic acid type ion exchange membrane.

9. The polymer electrolyte fuel cell according to claim 1, wherein the membrane-form solid polymer electrolyte is a non-fluorinated hydrocarbon phosphonic acid ion exchange membrane.

10. The polymer electrolyte fuel cell according to claim 1, wherein the fluorocarbon ion exchange resin is a fluorocarbon sulfonic acid ion exchange resin.

11. The polymer electrolyte fuel cell according to claim 1, wherein the fluorocarbon ion exchange resin is a fluorocarbon phosphonic acid ion exchange resin.

12. The polymer electrolyte fuel cell according to claim 1, wherein at least one of the fuel electrode and the air electrode contains a soluble perfluorocarbon polymer as a water repellant.

13. The polymer electrolyte fuel cell according to claim 12, wherein the soluble perfluorocarbon polymer is a thermoplastic polymer having repeating units of the following formulae:

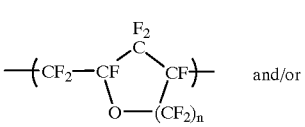 and/or

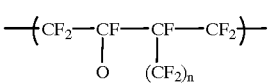

wherein n is an integer of 1 or 2.

* * * * *